United States Patent
Ho et al.

(10) Patent No.: US 7,050,655 B2
(45) Date of Patent: May 23, 2006

(54) METHOD FOR GENERATING AN ANIMATED THREE-DIMENSIONAL VIDEO HEAD

(75) Inventors: Randall Ho, Berkeley, CA (US); David Westwood, Palo Alto, CA (US); James Stewartson, Oakland, CA (US); Luciano Pasquale Agostino Nocera, Los Angeles, CA (US); Ulrich F. Buddemeier, Venice, CA (US); Gregory Patrick Lane Lutter, San Francisco, CA (US); Hartmut Neven, Santa Monica, CA (US)

(73) Assignee: Nevengineering, Inc., Sant Monica, CA (US)

( * ) Notice: Subject to any disclaimer, the term of this patent is extended or adjusted under 35 U.S.C. 154(b) by 526 days.

(21) Appl. No.: 09/929,295

(22) Filed: Aug. 13, 2001

(65) Prior Publication Data

US 2003/0031381 A1 Feb. 13, 2003

Related U.S. Application Data

(63) Continuation-in-part of application No. 09/871,370, filed on May 31, 2001, now Pat. No. 6,580,811, which is a continuation of application No. 09/188,079, filed on Nov. 6, 1998, now Pat. No. 6,272,231, and a continuation-in-part of application No. 09/724,320, filed on Nov. 27, 2000, which is a continuation-in-part of application No. 09/188,079, filed on Nov. 6, 1998, now Pat. No. 6,272,231.

(51) Int. Cl.
*G06K 9/36* (2006.01)

(52) U.S. Cl. ................ 382/285; 382/154; 382/294; 345/473; 348/42

(58) Field of Classification Search ................ 382/115, 382/117, 118, 154, 285, 294, 296, 282, 284, 382/287, 385; 345/419, 424, 473; 348/42, 348/47, 50

See application file for complete search history.

(56) References Cited

U.S. PATENT DOCUMENTS

| | | | |
|---|---|---|---|
| 4,725,824 | A | 2/1988 | Yoshioka |
| 4,805,224 | A | 2/1989 | Koezuka et al. |
| 4,827,413 | A | 5/1989 | Baldwin et al. |
| 5,159,647 | A | 10/1992 | Burt |
| 5,168,529 | A | 12/1992 | Peregrim et al. |
| 5,187,574 | A | 2/1993 | Kosemura et al. |
| 5,220,441 | A | 6/1993 | Gerstenberger |
| 5,280,530 | A | 1/1994 | Trew et al. |
| 5,333,165 | A | 7/1994 | Sun |
| 5,383,013 | A | 1/1995 | Cox |
| 5,430,809 | A | 7/1995 | Tomitaka |

(Continued)

FOREIGN PATENT DOCUMENTS

DE  4406020 C1  6/1995

(Continued)

OTHER PUBLICATIONS

International Search Report for PCT/US99/07935.

(Continued)

*Primary Examiner*—Samir Ahmed
*Assistant Examiner*—Yosef Kassa
(74) *Attorney, Agent, or Firm*—Robroy R. Fawcett

(57) ABSTRACT

The invention relates to a technique for generating an animated three-dimensional video head based on sensed locations of facial features and texture mapping of corresponding two dimensional video image frames onto a shaped head mesh generated using the sensed locations.

4 Claims, 3 Drawing Sheets

U.S. PATENT DOCUMENTS

| | | | |
|---|---|---|---|
| 5,432,712 A | 7/1995 | Chan | |
| 5,511,153 A | 4/1996 | Azarbayejani et al. | |
| 5,533,177 A | 7/1996 | Wirtz et al. | |
| 5,550,928 A | 8/1996 | Lu et al. | |
| 5,581,625 A | 12/1996 | Connell | |
| 5,588,033 A | 12/1996 | Yeung | |
| 5,680,487 A | 10/1997 | Markandey | |
| 5,699,449 A | 12/1997 | Javidi | |
| 5,714,997 A | 2/1998 | Anderson | |
| 5,715,325 A | 2/1998 | Bang et al. | |
| 5,719,954 A | 2/1998 | Onda | |
| 5,736,982 A | 4/1998 | Suzuki et al. | |
| 5,764,803 A | 6/1998 | Jacquin et al. | |
| 5,774,591 A | 6/1998 | Black et al. | |
| 5,802,220 A | 9/1998 | Black et al. | |
| 5,809,171 A | 9/1998 | Neff et al. | |
| 5,828,769 A * | 10/1998 | Burns | 382/118 |
| 5,917,937 A | 6/1999 | Szeliski et al. | |
| 5,982,853 A | 11/1999 | Liebermann | |
| 5,995,119 A * | 11/1999 | Cosatto et al. | 345/473 |
| 6,011,562 A | 1/2000 | Gagn | |
| 6,044,168 A * | 3/2000 | Tuceryan et al. | 382/118 |
| 6,052,123 A * | 4/2000 | Lection et al. | 345/419 |
| 6,072,496 A * | 6/2000 | Guenter et al. | 345/419 |
| 6,430,589 B1 * | 8/2002 | Jennings, III | 708/620 |
| 6,504,546 B1 * | 1/2003 | Cosatto et al. | 345/473 |
| 6,556,196 B1 * | 4/2003 | Blanz et al. | 345/419 |
| 6,580,811 B1 * | 6/2003 | Maurer et al. | 382/103 |
| 6,593,936 B1 * | 7/2003 | Huang et al. | 345/619 |
| 6,597,736 B1 * | 7/2003 | Fadel | 375/240.01 |
| 6,611,268 B1 * | 8/2003 | Szeliski et al. | 345/473 |

FOREIGN PATENT DOCUMENTS

EP          0807902 A2    11/1997

OTHER PUBLICATIONS

Akimoto, T., et Al., "Automatic Creation of Facial 3D Models", IEEE Computer Graphics & Apps., pp. 16-22, Sep. 1993.

Ayache, N. et al., "Rectification of Images for Binocular and Trinocular Stereovision", Proc. Of 9th Int'l., Conference on Pattern Recognition, 1, pp. 11-16, Italy, 1988.

Belhumeur, P., "A Bayesian Approach to Binocular Stereopsis", Int'l. J. Of Computer Vision, 19(3), pp. 237-260, 1996.

Beymer, D. J., "Face Recognition Under Varying Pose", MIT A.I. Lab, Memo No. 1461,pp. 1-13, Dec. 1993.

Beymer, D.J., "Face Recognition Under Varying Pose", MIT A.I. Lab. Research Report, 1994, pp. 756-761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155-159.

DeCarlo, D., et al., "The integration of Optical Flow and Deformable Models with Applications to Human Face Shape and Motion Estimation", pp. 1-15, In Proc. CVPR '96, pp. 231-238 (published)[TM 18.9.96].

Devemay, F. et al., "Computing Differential Properties of 3-D Shapes from Steroscopic Images without {3-D} Models", INRIA, RR-2304, pp. 1-28, Sophia, Antipolis, 1994.

Dhond, U., "Structure from Stereo: a Review", IEEE Transactions on Systems, Man, and Cybernetics, 19(6), pp. 1489-1510, 1989.

Fleet, D.J., et al., "Computation of Component Image Velocity from Local Phase Information", *Int., J. Of Computer Vision*, 5:1, pp. 77-104 (1990).

Fleet, D.J., et al. *Measurement of Image Velocity*, Kluwer Academic Press, Boston, pp. 1-203,1992.

Hall, E.L., "Computer Image Processing And Recognition", Academic Press 1979, 99. 468-484.

Hong, H.,et al., "Online Facial Recognition based on Personalized Gallery", Proceedings of Int'l Conference On Automatic Face And Gesture Recognition, pp. 1-6, Japan Apr. 1997.

Kolocsai, P., et al, Statistical Analysis of Gabor-Filter Representation, *Proceedings of International Conference on Automatic Face and Gesture Recognition, 1997*, 4 pp.

Kruger, N., "Visual Learning with a priori Constraints", *Shaker Verlag*, Aachen, Germany, 1998, pp. 1-131.

Kruger, N., et al., "Principles of Cortical Processing Applied to and Motivated by Artificial Object Recognition", Institut fur Neuroinformatik, *Internal Report 97-17*, Oct. 1997, pp. 1-12.

Kruger, N., et al., "Autonomous Learning of Object Representations Utilizing Self-Controlled Movements", 1998, *Proceedings of NN98*, 5 pp.

Kruger, N., et al, "Object Recognition with a Sparse and Autonomously Learned Representation Based on Banana Wavelets", *Internal Report 96-11*, Institut fur Neuroinformatik, Dec. 1996, pp. 1-24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using a *priori* Constraints", *IEEE Transactions on Pattern Analysis and Machine Intelligence*, vol. 19, No. 7, Jul. 1997, pp. 764-768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1-46.

Manjunath, B. S., et al, "A Feature Based Approach to Face Recognition", *In Proceedings IEEE Conference on Computer Vision and Pattern Recognition*, pp. 373-378, Mar. 1992.

Mauer, T., et al, "Single-View Based Recognition of Faces Rotated in Depth", In *Proceedings of the International Workshop on Automatic Face and Gesture Recognition*, pp. 248-253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353-358, Paris, France, Oct. 9-13, 1995.

Mauer, T., et al, "Tracking and Learning Graphs and Pose on Image Sequences of Faces", *Proceedings of 2nd International Conference on Automatic Face and Gesture Recognition*, Oct. 14-16, 1996, pp. 176-181.

Maybank, S. J., et al, "A Theory of Self-Calibration of a Moving Camera", *International Journal of Computer Vision*, 8(2), pp. 123-151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple-Baseline Stereo", *IEEE Trans. on Pattern Analysis and Machine Intelligence*, vol. 15, No. 4, pp. 353-363, Apr. 1993.

Peters, G., et al, "Learning Object Representations by Clustering Banana Wavelet Responses", *Tech. Report IR-INI*

96-09, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18-22, 1997, 10 pages.

Pighin, F, et al, "Synthesizing Realistic Facial Expressions from Photographs", In *SIGGRAPH 98 Conference Proceedings*, pp. 75-84, Jul. 1998.

Roy, S., et al, "A Maximum Flow Formulation of the N-Camera Stereo Correspondence Problem", *IEEE, Proceedings of International Conference on Computer Vision*, Bombay, India, Jan. 1998, pp. 1-6.

Sara, R. et al "3-D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish-Scales: Representing Fuzzy Manifolds", *Proceedings International Conference Computer Vision, ICCV '98*, pp. 811-817, Bombay, Jan. 1998.

Sara, R., et al, "On Occluding Contour Artifacts in Stereo Vision", *IEEE, Proceedings of Interrnational Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase-Based Binocular Vergence Control and Depth Reconstruction using Active Vision", *CVGIP: Image Understanding*, vol. 60, No. 3, Nov. 1994, pp. 343-358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71-86, 1991.

Wiskott, L., et al, "Face Recognition and Gender Determination", *Proceedings of International Workshop on Automatic Face and Gesture Recognition*, pp. 92-97, Zurich CH, Jun. 26, 1995.

Wiskott, L., et al, "Face Recognition by Elastic Bunch Graph Matching", *Internal Report, IR-INI 96-08*, Institut fur Neuroinformatk, Ruhr-Universitat, Bochum, pp. 1-21, Apr. 1996.

Wiskott, L., "Labeled Graphs and Dynamic Link Matching for Face Recognition and Scene Analysis", *Verlag Harr Deutsch*, Thun-Frankfurt am Main. Reihe Physik, Dec. 1995, pp. 1-109.

Wiskott, L., "Phanton Faces for Face Analysis", *Proceedings of 3rd Joint Symposium on Neural Computation*. Pasadena, CA, vol. 6, pp. 46-52, Jun. 1996.

Wiskott, L., "Phanton Faces for Face Analysis". *Internal Report, IR-INI 96-06*, Institut fur Neoroinformatik, Ruhr-Universitat, Bochum, Germany, Apr. 1996, 12 pp.

Wiskott, L. "Phantom Faces for Face Analysis", *Pattern Recognition*, vol. 30, No. 6, pp. 837-846, 1997.

Wiskott, L., et al, "Face Recognition by Elastic Bunch Graph Matching", *IEEE Transactions on Pattern Analysis and Machine Intelligence*, 19(7), pp. 775-779, 1997.

Wong, R., et al, "PC-Based Human Face Recognition System", *IEEE*, pp. 641-644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769-775.

Wurtz, R., et al, "Corner Detection in Color Images by Multiscale Combination of End-stopped Cortical Cells", *Artificial Neural Networks—ICANN '97*, Lecture Notes in Computer Science, vol. 1327, pp. 901-906, Springer-Verlag, 1997.

Yao, Y., et al, "Tracking a Dynamic Set of Feature Points", *IEEE Transactions on Image Processing*, vol. 4, No. 10, Oct., 1995, pp. 1382-1394.

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585-608.

Yang, Tzong Jer, "Face Analysis and Synthesis", Jun. 1, 1999, Retrieved from Internet, http://www.cmlab.csie.ntu.edu.tw/ on Oct. 25, 2002, 2 pg.

Yang, Tzong Jer, "VR-Face: An Operator Assisted Real-Time Face Tracking System", Communication and Multimedia Laboratory, Dept. of Computer Science and Information Engineering, National Taiwan University, Jun. 1999, pp. 1-6.

\* cited by examiner

METHOD FOR GENERATING AN ANIMATED THREE-DIMENSIONAL VIDEO HEAD

This application is a continuation-in-part of U.S. application Ser. No. 09/871,370, filed May 31, 2001, now U.S. Pat. No. 6,580,811, which is a continuation of U.S. application Ser. No. 09/188,079, filed Nov. 6, 1998, now U.S. Pat. No. 6,272,231.

This application is also a continuation-in-part of U.S. application Ser. No. 09/724,320, filed Nov. 27, 2000, which is a continuation-in-part of U.S. application Ser. No. 09/188,079, filed Nov. 6, 1998, now U.S. Pat. No. 6,272,231.

BACKGROUND OF THE INVENTION

The present invention relates to head animation, and more particularly, to generating an animated three-dimensional video head based on two-dimensional video images.

Virtual spaces filled with avatars are an attractive way to allow for the experience of a shared environment. However, animation of a photo-realistic avatar generally requires intensive graphic processes, particularly for rendering facial features.

Accordingly, there exists a significant need for improved rendering of facial features. The present invention satisfies this need.

SUMMARY OF THE INVENTION

The present invention is embodied in a method for generating an animated three-dimensional video head. In the method, a sequence of two-dimensional video image frames of the face of an actor is captured. For each video image frame, the locations of the actor's facial features are sensed at predetermined node locations. Each node location is associated with a particular facial feature. Control points on a three-dimensional head mesh are driven based on the sensed node locations to generate a shaped three-dimensional head mesh. The video image frame used to generate the sensed node location is warped for projection onto the shaped head mesh. The warped video image frame is texture mapped onto the shaped head mesh to generate a three-dimensional frame head associated with the respective video image frame. The three-dimensional video head is animated by displaying a sequence of the three-dimensional frame heads associated with the sequence of video image frames.

In more detailed features of the invention, the step of sensing the locations of the facial features in the sequence of video image frames is performed using transformed facial image frames generated based on wavelet transformations, such as Gabor wavelet transformations.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

The present invention provides a technique for generating an animated three-dimensional video head based on sensed locations of facial features and texture mapping of corresponding two-dimensional video image frames onto a shaped head mesh generated using the sensed locations. The use of facial feature location sensing in combination with texture mapping of the same video image frame used in the facial feature location sensing, provides a animated three-dimensional video head having desirable photo-realistic properties.

Figure 1:
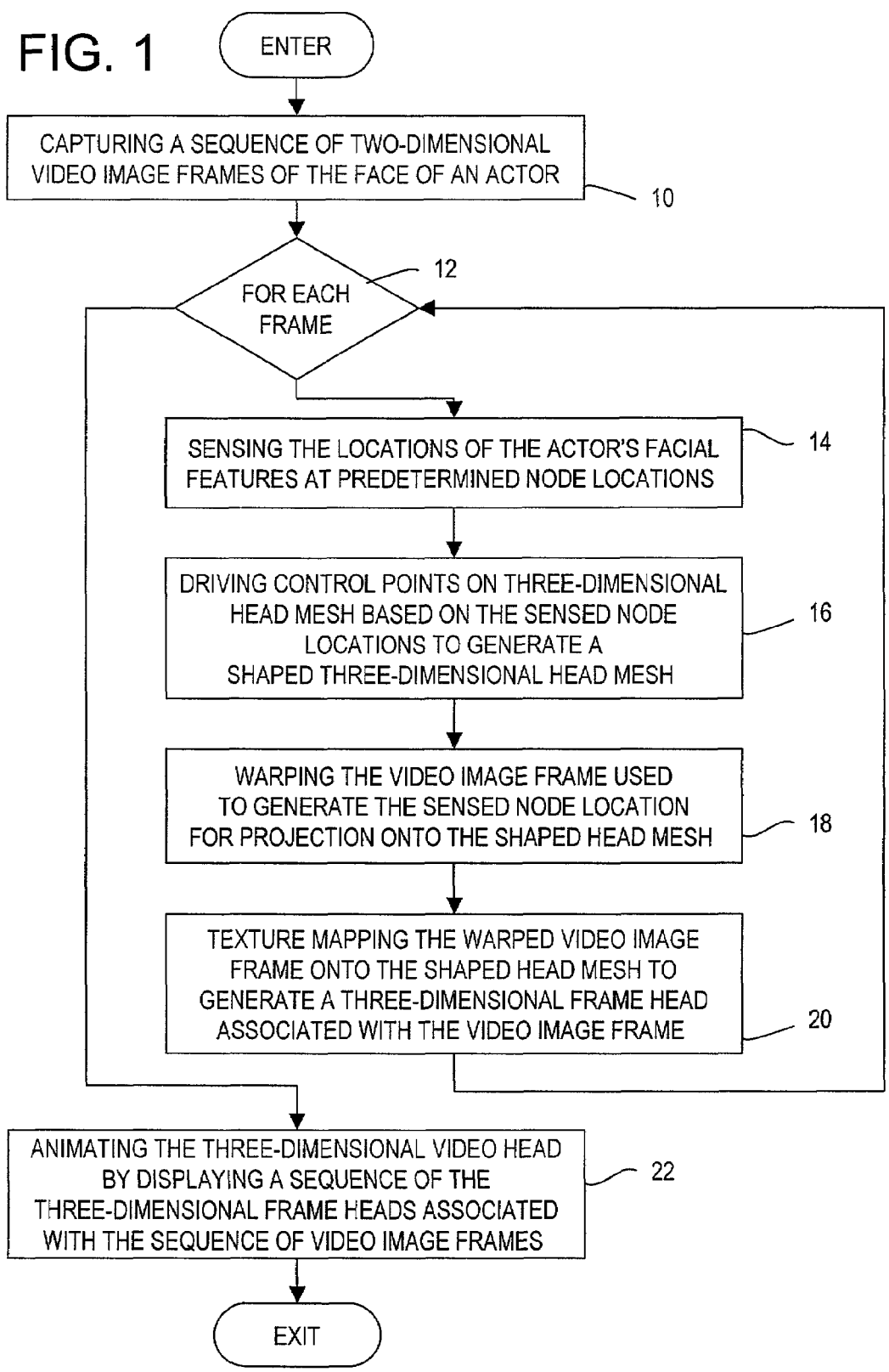
FIG. 1 is a flow diagram showing a technique for generating an animated three-dimensional video head, according with the invention.
Figure 2:
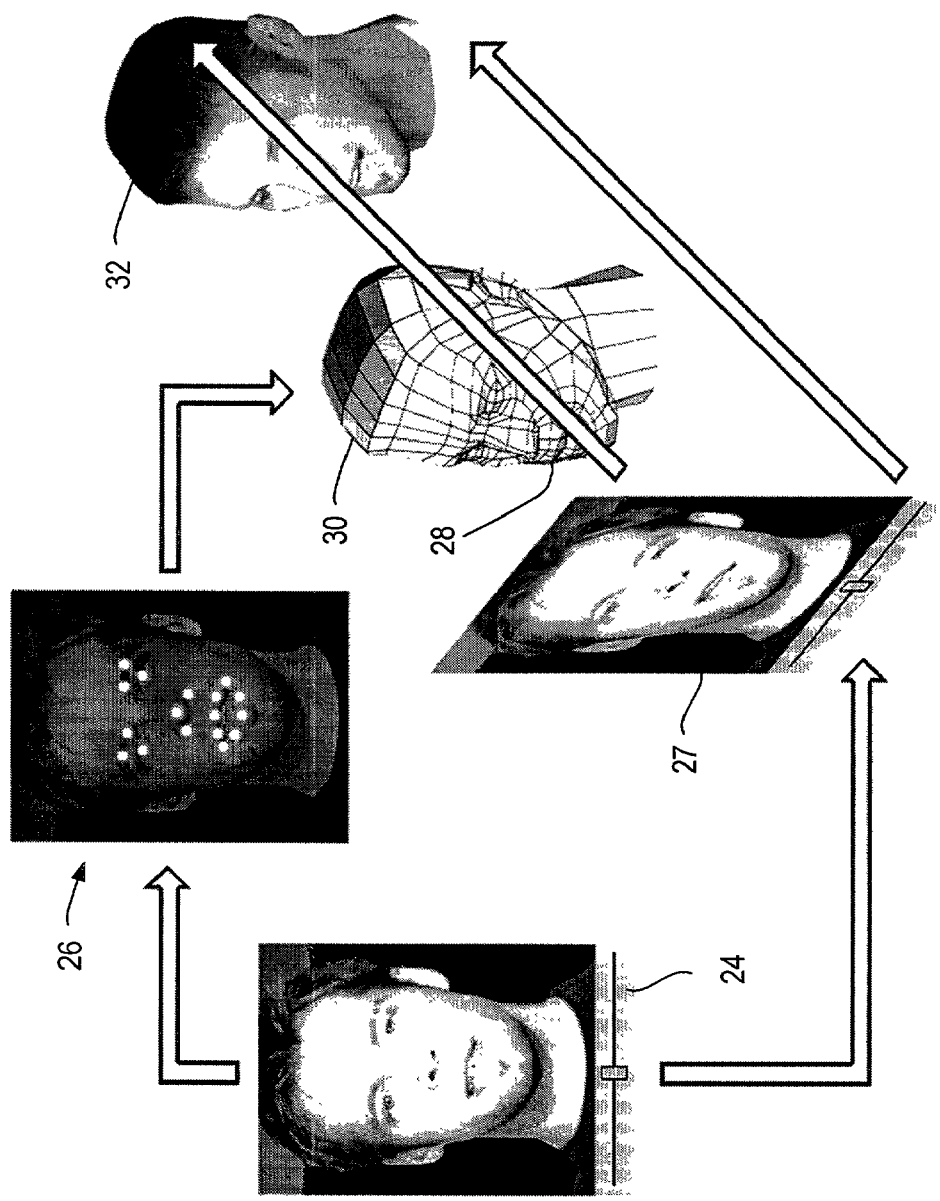
FIG. 2 is a schematic flow diagram showing the technique for generating the animated three-dimensional video head of FIG. 1, according with the invention.

With reference to FIGS. 1 and 2, in the method for generating an animated video head, a sequence of video image frames 24 of the face of an actor is captured (step 10). For each video image frame (step 12), the locations 26 of the actor's facial features are sensed at predetermined node locations (step 14). Each node location is associated with a particular facial feature. Control points 28 on a three-dimensional head mesh are driven based on the sensed node locations to generate a shaped three-dimensional head mesh 30 (step 16). The video image frame used to generate the sensed node location is warped for projection onto the shaped head mesh (step 18). The warped video image frame 27 is texture mapped onto the shaped head mesh to generate the three-dimensional frame head 32 associated with the respective video image frame (step 20). The three-dimensional video head is animated by displaying a sequence of the three-dimensional frame heads associated with the sequence of video image frames (step 22).

Figure 3:
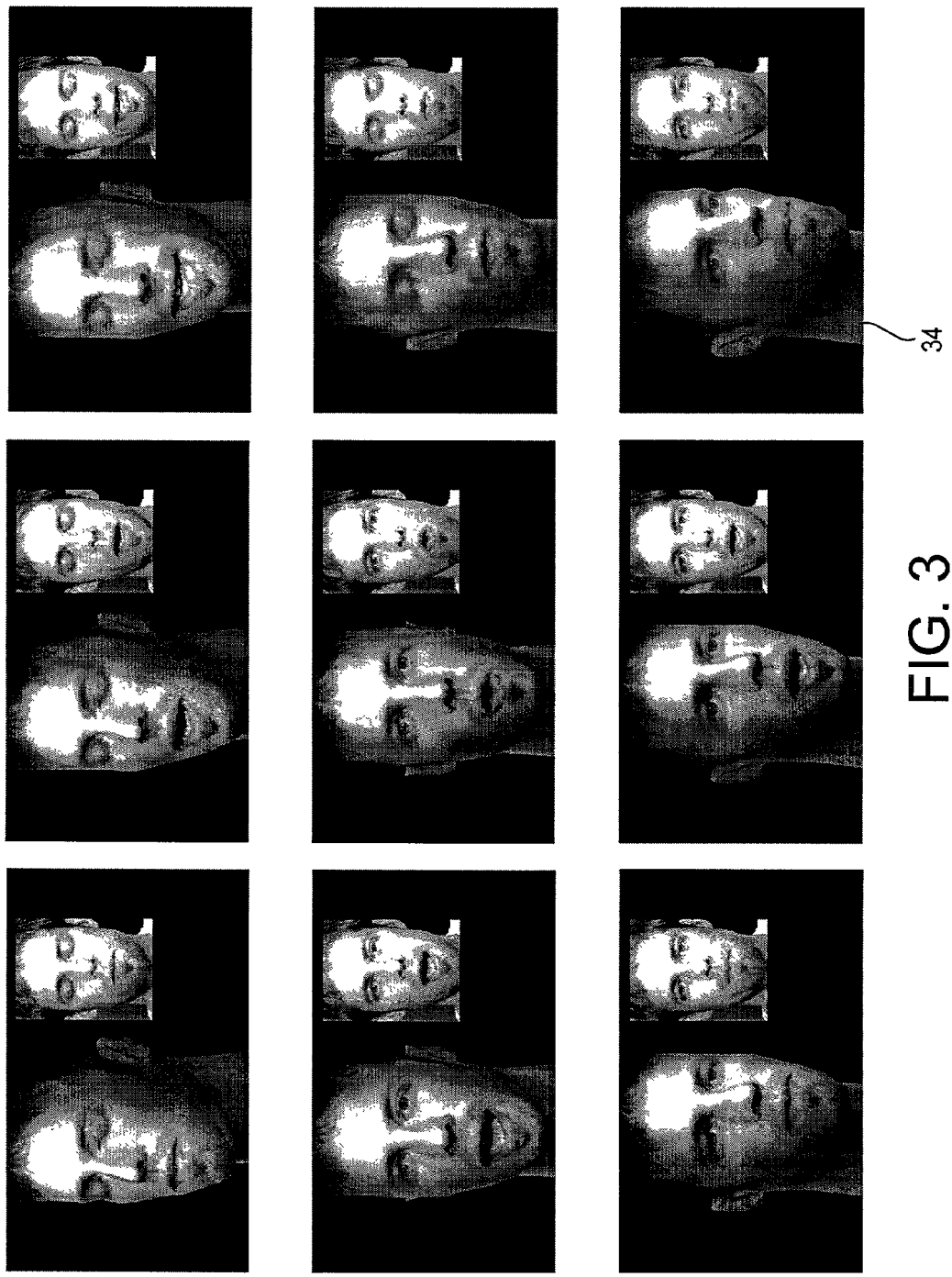
FIG. 3 is a series of image frames illustrating an animation of a three-dimensional video head, according to the invention.

An example of an animated three-dimensional video head is shown in FIG. 3. A sequence of image frames 34 shows a rotating three-dimensional video head. The first image frame of the sequence is in the upper left-hand corner of FIG. 3 and the last image frame of the sequence is in the lower right-hand corner. Each image frame shows a two-dimensional video image frame 24 overlaid on a two-dimensional projection of the resulting rotating three-dimensional frame head 32.

The step of sensing the locations of the facial features in the sequence of video image frames may be performed using transformed facial image frames generated based on wavelet transformations, such as Gabor wavelet transformations.

Facial feature finding and tracking using Gabor wavelet tracking and jet graph matching is described in U.S. Pat. No. 6,272,231, titled WAVELET-BASED FACIAL MOTION CAPTURE FOR AVATAR ANIMATION. Imaging systems for acquiring images and image mapping are described in U.S. patent application Ser. No. 09/724,320, titled METHOD AND APPARATUS FOR RELIEF TEXTURE MAP FLIPPING (published in a continuation U.S. application Ser. No. 10/238,289, as U.S. Publication No. US 2003/0007666 A1). The entire disclosures of U.S. Pat. No. 6,272,231 and U.S. patent application Ser. No. 09/724,320 are incorporated herein by reference.

Although the foregoing discloses the preferred embodiments of the present invention, it is understood that those skilled in the art may make various changes to the preferred embodiments without departing from the scope of the invention. The invention is defined only the following claims.

We claim:

1. A method for generating a three-dimensional animated video head, comprising steps for:
   capturing a sequence of two-dimensional video image frames of the face of an actor;
   for each two-dimensional video image frame:
      sensing the locations of the actor's facial features at predetermined node locations in the two-dimensional video image frame, wherein each node location is associated with a particular facial feature;
      driving control points on a three-dimensional head mesh based on the sensed node locations in the two-dimensional video image frame to generate a shaped three-dimensional head mesh;
      warping the two-dimensional video image frame used to generate the sensed node locations for projection onto the shaped head mesh; and
      texture mapping the warped two-dimensional video image frame onto the shaped head mesh to generate a three-dimensional frame head associated with the respective two-dimensional video image frame; and
   animating the three-dimensional video head by displaying a sequence of the three-dimensional frame heads associated with the sequence of two-dimensional video image frames.

2. Method for generating a three-dimensional animated video head as defined in claim 1, wherein the step of sensing the locations of the actor's facial features at predetermined node locations in the two-dimensional video image frame is performed using a transformed facial image frame generated based on wavelet transformations.

3. Method for generating a three-dimensional animated video head as defined in claim 1, wherein the step of sensing the locations of the actor's facial features at predetermined node locations in the two-dimensional video image frame is performed using a transformed facial image frame generated based on Gabor wavelet transformations.

4. Method for generating a three-dimensional animated video head as defined in claim 1, wherein each two-dimensional image frame, in the sequence of two-dimensional video image frames, has only one view of the actor's face.

* * * * *